United States Patent
Bonaventure

(10) Patent No.: US 7,403,478 B2
(45) Date of Patent: *Jul. 22, 2008

(54) METHOD FOR DATA TRAFFIC POLICING, A DATA TRAFFIC POLICER REALIZING SUCH A METHOD AND A TELECOMMUNICATION NETWORK INCLUDING SUCH A DATA TRAFFIC POLICER

(75) Inventor: Olivier Bonaventure, Gembloux (BE)

(73) Assignee: ALCATEL, Paris (FR)

( * ) Notice: Subject to any disclaimer, the term of this patent is extended or adjusted under 35 U.S.C. 154(b) by 900 days.

This patent is subject to a terminal disclaimer.

(21) Appl. No.: 10/682,404

(22) Filed: Oct. 10, 2003

(65) Prior Publication Data

US 2004/0076115 A1    Apr. 22, 2004

Related U.S. Application Data

(63) Continuation of application No. 09/453,529, filed on Dec. 3, 1999, now Pat. No. 6,678,247.

(30) Foreign Application Priority Data

Dec. 17, 1998    (EP) ................................. 98403202

(51) Int. Cl.
*H04L 1/00* (2006.01)
*H04L 12/26* (2006.01)

(52) U.S. Cl. ................. 370/230; 370/235; 370/252; 370/394; 370/412; 370/422; 709/213; 709/228; 709/231; 709/236

(58) Field of Classification Search ................. 370/229, 370/230, 230.1, 235, 236, 252, 253, 394, 370/412, 417, 418, 422; 709/213, 227, 228, 709/230, 231, 236

See application file for complete search history.

(56) References Cited

U.S. PATENT DOCUMENTS 5,459,719 A * 10/1995 Hayashi ................. 370/236

(Continued)

OTHER PUBLICATIONS

'ATM Forum Technical Committee' distributed to the ATMF Traffic Management Working Group, by O. Bonaventure, P. Frene and E. Desmet. Feb. 8-13, 1998 Anaheim, California, reference 98-0059.

(Continued)

*Primary Examiner*—Hassan Kizou
*Assistant Examiner*—Brian T. O'Connor
(74) *Attorney, Agent, or Firm*—Sughrue Mion, PLLC

(57) ABSTRACT

The present invention concerns a method for use in a telecommunication network by a data traffic policer for data traffic policing on a data communication link. The data traffic includes data cells that are grouped into frames. For each data cell of a frame, upon reception of the data cell, the method checks a conformance of the data cell and provides a conformance result of the data cell being any one of conforming and non-conforming. The method further stores the data cell into a buffer and treats the frame as conforming in the event when for each data cell of the frame that is stored in the buffer the conformance result is conforming; and in the event when the frame is treated as conforming and upon reception of a predefined data cell of the frame, the method starts transmission of a predefined number of data cells of the frame by the traffic policer.

16 Claims, 1 Drawing Sheet

U.S. PATENT DOCUMENTS

| | | | |
|---|---|---|---|
| 5,524,006 A | | 6/1996 | Hluchyj et al. |
| 5,526,353 A | * | 6/1996 | Henley et al. ............... 370/392 |
| 5,533,020 A | * | 7/1996 | Byrn et al. ............... 370/395.4 |
| 5,539,740 A | * | 7/1996 | Bruckner .................... 370/394 |
| 5,541,926 A | * | 7/1996 | Saito et al. .................. 370/474 |
| 5,587,997 A | * | 12/1996 | Jacobson .................... 370/253 |
| 5,619,499 A | * | 4/1997 | Nakabayashi ............... 370/469 |
| 5,627,836 A | * | 5/1997 | Conoscenti et al. ......... 370/397 |
| 5,629,936 A | * | 5/1997 | Lee et al. .................... 370/230 |
| 5,633,865 A | * | 5/1997 | Short ......................... 370/412 |
| 5,666,353 A | | 9/1997 | Klausmeier et al. |
| 5,675,740 A | * | 10/1997 | Heimsoth et al. ........... 709/228 |
| 5,682,377 A | * | 10/1997 | Dirksen et al. .............. 370/236 |
| 5,694,390 A | * | 12/1997 | Yamato et al. .............. 370/230 |
| 5,764,641 A | | 6/1998 | Lin |
| 5,831,971 A | | 11/1998 | Bonomi et al. |
| 5,926,476 A | * | 7/1999 | Ghaibeh ................. 370/395.65 |
| 6,049,530 A | * | 4/2000 | Petersen et al. ............. 370/248 |
| 6,266,327 B1 | * | 7/2001 | Hernandez-Valencia .... 370/252 |
| 6,628,614 B2 | * | 9/2003 | Okuyama et al. ......... 370/230.1 |
| 6,678,247 B1 | * | 1/2004 | Bonaventure ............... 370/230 |
| 6,741,557 B1 | * | 5/2004 | Petit ........................... 370/230 |
| 6,762,996 B1 | * | 7/2004 | Petit ........................... 370/230 |

OTHER PUBLICATIONS

'ATM Forum Technical Committee' distributed to the ATMF Traffic Management Working Group, by O. Bonaventure, and E. Desmet, Apr. 20-24, 1998, Berlin Germany Reference 98-0281.

Drury, D. M.: ATM Traffic Management and the Impact of a ATM Switch Design Computer Networks and ISDN Systems, vol. 28, No. 4, Feb. 1996, pp. 471-479, XP000553072.

* cited by examiner

METHOD FOR DATA TRAFFIC POLICING, A DATA TRAFFIC POLICER REALIZING SUCH A METHOD AND A TELECOMMUNICATION NETWORK INCLUDING SUCH A DATA TRAFFIC POLICER

BACKGROUND OF THE INVENTION

This is a Continuation of application Ser. No. 09/453,529 filed Dec. 3, 1999, now U.S. Pat. No. 6,678,247 the disclosure of which is incorporated herein by reference.

The present invention relates to a method for use in a telecommunication network by a data traffic policer, to a data traffic policer realizing such a method and to a telecommunication network including such a data traffic policer.

Such a method to police data traffic realized by such a data traffic policer is already known in the art e.g. from two contributions to the 'ATM Forum Technical Committee' and distributed to the 'ATMF Traffic Management Working Group'. The first one, written by O. Bonaventure, P. Frêne and E. Desmet, with the aim to stimulate the formalization of the current textual conformance definition for the Guaranteed Frame Rate service category, was made available to the public on Feb. 8-13, 1998 at Anaheim, Calif., reference 98-0059. The second one, written by O. Bonaventure and E. Desmet, with the aim to discuss the possible options for a formal Guaranteed Frame Rate GFR conformance definition and propose of choice, was made available to the public on Apr. 20-24, 1998 at Berlin, Germany, reference 98-0281. These documents will be referred to by the reference numbers 98-0059 and 98-0281, respectively, in this application.

Both documents are describing conformance definitions for the Guaranteed Frame Rate service GFR category. Data traffic policing on a data communication link is performed for data traffic including data cells being grouped into frames. Upon reception of a data cell at such a data traffic policer, the data cell is checked upon its conformance by a decision means. The decision means provides a conformance result that is either conforming or non-conforming.

According to the 98-0281 document, each arriving data cell of a frame is verified upon its conformance by a conformance test e.g. a Peak Cell Rate test PCR, or Cell Delay Variation Tolerance test CDVT according to a Guaranteed Frame Rate GFR contract of a user. In the event that the head of a frame is conforming i.e. each data cell of the head of the frame is conforming, and a non-conforming data cell arrives, the following data cells of this frame i.e. the tail of the frame, except the last cell, is also declared as non-conforming.

It has to be explained that according to the management strategy of the operator a non-conforming cell is discarded or is marked as non-conforming. Marking a non-conforming data cell is called tagging. Furthermore, the tagged data cells and tagged frames are counted by the operator.

When the non-conforming cells are e.g. discarded, the conforming cells of the same frame which are already distributed into the network, becomes part of an incomplete frame which makes these conforming data cells also non-conforming. When the non-conforming data cells are e.g. marked, according to predefined statistic rules of the operator it is decided that at a predefined amount of non-conforming traffic, a connection is interrupted which makes again that conforming frames or conforming cells which are already distributed into the network are becoming non-conforming.

In this way, the conforming head of a frame that is distributed in the network becomes an incomplete frame and this incomplete frame utilizes network resources before being discarded at its destination. This incomplete frame provides extra traffic to the network.

SUMMARY OF THE INVENTION

An object of the present invention is to provide a method for data traffic policing of the above known type but which provides an improved use of the network resources i.e. a lower percentage of non-conforming data cells being distributed in the network.

Indeed, the basic idea of the invention is based on the insight that by directly transmitting a conforming data cell, after its conformance check, into the network it is possible that it becomes later on a non-conforming data cell due to non-conformance of other cells inside the frame which cause the entire frame to be non-conforming.

However, according to the present invention the data cells are buffered into a buffer means after its conformance check while a status means keeps track of a conformance status of the frame. The conformance status of the frame is conforming as long that for each data cell of the frame that is stored in the buffer means the conformance result is conforming. A smaller risk is taken when, as long that the conformance status of the frame is conforming, only a predefined number of data cells of the frame is transmitted by a transmitting means upon reception of a predefined data cell of the frame. This will become more clear with the example of the following paragraph.

Presume a situation wherein data cells of a frame are received, checked upon its conformance and buffered by such a traffic policer. All buffered data cells have a conformance result that is conforming. This means that the frame is still treated as conforming. Upon arrival of a predefined data cell e.g. a data cell in the middle of the frame, the data traffic policer starts transmission of a predefined number of data cells e.g. a quarter of the total number of data cell of the frame, hereafter called first packet data cells. While this first packet data cells are transmitted into the network, the data traffic policer continues its work i.e. reception of the following data cells of the frame, checking its conformance and storing them into the buffer. Presume that for the nearly last data cell of the frame its conformance result is non-conforming. This means that according to the known conformance rules also the data cells received after this non-conforming data cell are declared non-conforming. As described above, all the previous data cells to this non-conforming data cell will become part of an incomplete frame and are thereby also non-conforming. However, only the first packet data cells were transmitted into the network since the other data cells are still present in the buffer. Compared to the prior art situation i.e. without a buffer, the data traffic policer of the present invention provides an improved use of the network resources i.e. a lower percentage of non-conforming data cells are distributed in the network.

An implementation of the present invention is that in the event when the frame is still treated as conforming and upon reception of the predefined data cell of the frame which is determined by the last data cell of the frame, the frame is also declared by the status means as conforming when this last data cell has also a conformance result which is conforming. The transmitting means starts transmission of a predefined number of data cells that is determined by the total number of data cells of the frame. This means that a frame is declared to be conforming when all the data cells of a frame are conforming and only when the frame is declared to be conforming all its data cells are transmitted into the network.

Another characteristic feature of the present invention is that the conformance of the data cells is checked according to cell based conformance rules or according to frame based conformance rules. Indeed, as it is described in the 98-0281 document, different options are possible for e.g. a Guaranteed Frame Rate GFR conformance definition. These options are taking into account cell related features such as the Cell Loss Priority bit, the Peak cell Rate and the Cell Delay Variation Tolerance, and also frame related features such as the Maximum Frame size. Furthermore, more than one conformance test can be executed in order to complete the conformance check according to the present invention, whereby a predefined structure is brought into the sequence of the different conformance tests.

Finally, it has to be explained that a telecommunication network that includes a data traffic policer according to the present invention can support different kinds of Quality Of Service Categories whereby the conformance is checked according to the conformance definitions of the supported service category. Such a supported service category is e.g. the unspecified Bit Rate service category or the Guaranteed Frame Rate service category.

It should be noticed that the term "including", used in the claims, should not be interpreted as being limitative to the means listed thereafter. Thus, the scope of the expression "a device including means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and in input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying FIG. which illustrates a block diagram of a data traffic policer according to the present invention.

DETAILED DESCRIPTION OF THE INVENTION

Figure 1:
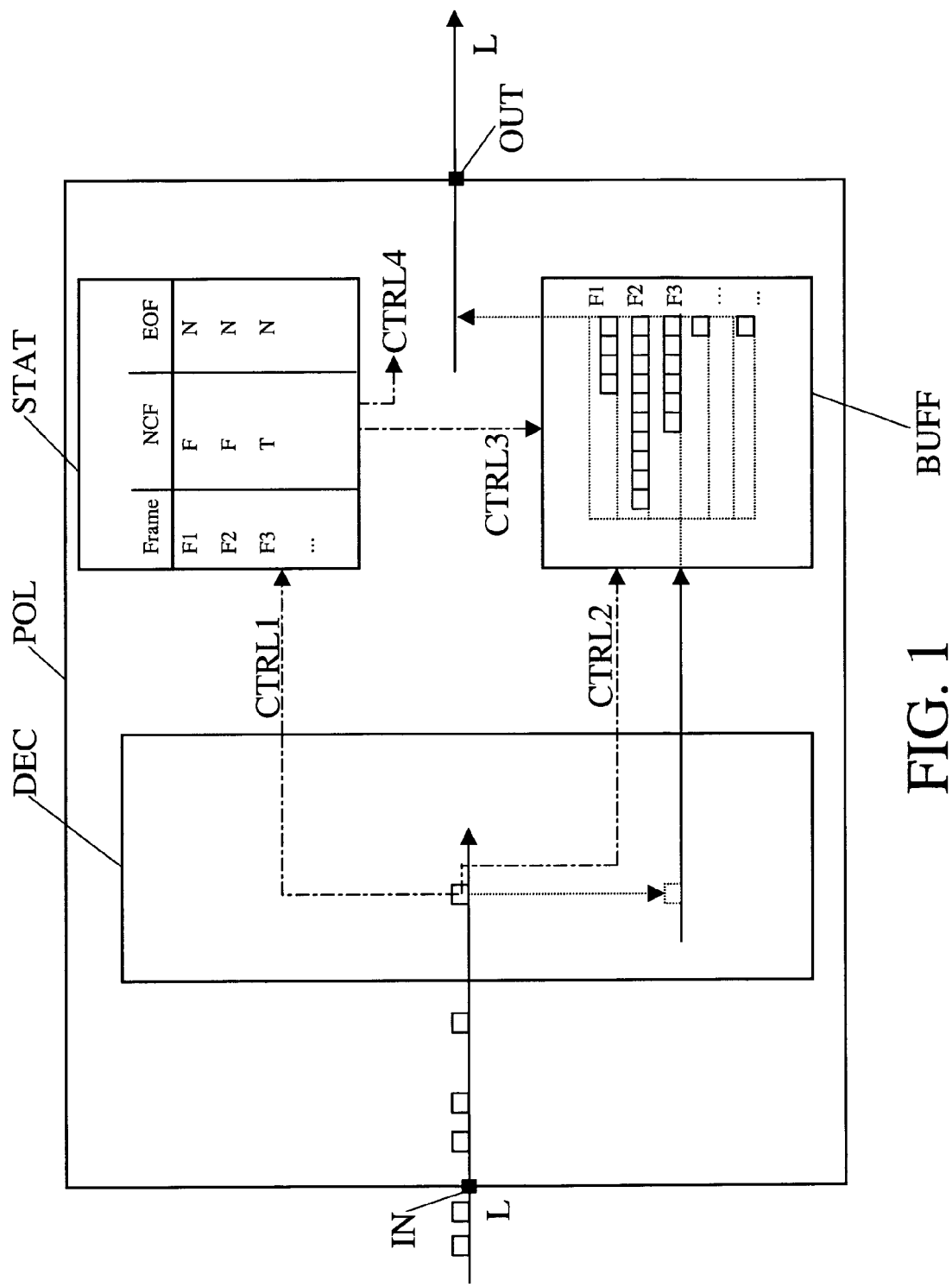

Referring to FIG. 1, the working of the data traffic policer POL will be explained by means of a functional description of the blocks shown therein. Based on this description, implementation of the functional blocks will be obvious to a person skilled in the art and will therefore not be described in detail. In addition, the principle working of the data traffic policer regarding the invention will be described in further detail.

According to FIG. 1, the data traffic policer is coupled on a data communication link L of a telecommunication network. The data communication link L is coupled to an input IN and to an output OUT of the data traffic policer. The data traffic on the data communication link L includes data cells that are grouped into frames. FIG. 1 shows some data cells on the communication link L.

The traffic policer POL includes three functional blocks: a decision means DEC, a status means STAT and a buffer BUFF. The decision means is coupled to the input IN of the data traffic policer POL and is implemented by a first processor. The status means is coupled to the decision means and is implemented by a second processor. The buffer BUFF is coupled to the decision means DEC and to the status means STAT. The buffer BUFF is furthermore coupled to the output OUT of the data traffic policer POL.

Upon reception of a data cell of a frame by the data traffic policer, the decision means DEC checks the conformance of the data cell. This action is executed according to different steps. For this preferred embodiment each data cell is checked upon its conformance according to the overall Guaranteed Frame Rate GFR conformance definition as described according to the first main test of the cited prior art document with reference 98-0059. As it is described in this document at paragraph 3, the overall GFR conformance definition is composed of two main tests that operate in sequence. The first test verifies the conformance of the cell flow to the maximum frame size MFS, the peak cell rate PCR, the cell delay variation tolerance CDVT and the cell loss priority bit CLP of the traffic contract. These four formalized conformance definitions are described in paragraph 4 of the referred document ATM-Forum 98-0059:

4.1 MFS conformance definition;
4.2 PCR conformance definition;
4.3 Frame delineation;
4.4 CLP conformance definition; that is hereby incorporated by reference. The information required to implement the four tests of the decision means DEC is obtainable from this document. By executing these four tests, the decision means DEC provides a conformance result for the data cell that equals conforming or non-conforming data cell.

It has to be remarked that one of the steps during the conformance check is to detect the position of the received data cell in its frame: first cell, middle cell or last cell of a frame. This information will also be used later on by the buffer means BUFF and the status means STAT.

The conformance result is included in a first control signal CTRL1 and is provided by the decision means DEC to the status means STAT. The data cell itself is provided by the decision means DEC to the buffer means BUFF.

The buffer BUFF stores the data cell according to the frame whereto the data cells belongs. This means that the buffer BUFF must known to what frame the data cell belongs. In order to realize this, the buffer BUFF is coupled via an extra control connection to the decision means. Via this control connection a second control signal CTRL2 is provided to the buffer means BUFF. This second control signal CTRL2 includes the frame identity e.g. F2 of the frame whereto the transmitted data cell belongs. With this information the buffer BUFF is enabled to manage the buffering of data cells per frame.

It has to be remarked that the use of a second control signal CTRL2 in order to forward the identification of a frame of a data cell is only a possible implementation of the present invention. Indeed, in e.g. an ATM network the fields of Virtual Channel Identifier and Virtual Path Identifier of the ATM data cells itself can be used as identification of the frame to which the data cell belongs whereby the second control signal CTRL2 is not needed anymore.

Furthermore the functional block of the butter BUFF includes a transmitter to transmits the data cells of a particular frame to the output OUT of the data traffic policer POL upon reception of a third control signal CTRL3 from the status means STAT. This transmitter of the buffer BUFF is not shown in FIG. 1 in order not to overload FIG. 1. The third control signal CTRL3 will be further explained in a following paragraph.

The status means STAT keeps track of the conformance result for each data cell of each frame. In stead of e.g. storing for each data cell of each frame its conformance result it is preferred for this embodiment to work with only one parameter for each frame. Indeed, a frame is treated as conforming as long as for each data cell of the frame its conformance result is conforming. Once the conformance result for one data cell was not conforming the frame is not treated as being conforming anymore. This information is implemented with a non-conforming frame NCF parameter for each frame. Furthermore, together with the conformance result, also the position of the data cell in its frame and the reference of the frame, as described above, are included in the first control signal CTRL1 that is provided by the decision means DEC to the status means STAT. Upon reception of a first data cell of a frame, this non-conforming frame parameter is initialized to a value "false" F. As long that each conformance result of each received data cell of a particular frame is conforming this value "false" F will be kept. This means that each time that a data cell is checked upon its conformance and the conformance result is provided to the status means, the status means interprets the conformance result. The non-conforming frame NCF parameter of the associated frame is remained to the value "false" F when the conformance result is conforming and is changed to the value "true" T when the conformance result is non conforming. Referring to the status means STAT of FIG. 1, the status of the non conforming frame parameter is shown with a table: the first column of the table gives a reference to the different frames e.g. F1, F2, F3, . . .; the second column of the table provides the value of the non conforming frame parameter NCF of the associated frame e.g. for frame F1 the NCF value is false which is shown with F and for frame F3 the NCF value is true which is shown with T. The table further includes a third column that will be explained in a further paragraph.

It has to be explained that for this particular embodiment it is preferred to start transmission of a total frame, in the event that the NCF parameter is still false F, upon reception of the last data cell of a frame. This means that in the event when the last data cell of a frame is checked by the decision means DEC upon its conformance, a first control signal CTRL1 is provided to the status means STAT. The first control signal CTRL1 includes the end of frame information and the conformance result of this last data cell. When this conformance result is conforming and the non-conforming frame parameter of the related frame is still false F, the status means STAT will not change this value. The fact that a last data cell of a frame is received is shown in the third column of the table. Upon reception of a first data cell of a frame, the value of a parameter "end of frame" EOF associated to the referred frame e.g. F1 is initialized to a value "No" N. Now, upon reception of the end of frame indication, the value of the parameter associated to the referred frame e.g. is changed to the value "Yes" Y. Once the two parameters of a particular frame i.e. non-conforming frame NCF and end of frame EOF have the value F and Y, respectively, the status means STAT declares the frame as conforming. When a frame is declared as conforming a third control signal CTRL3 is generated and provided to the buffer BUFF. The third control signal CTRL3 includes the reference to the frame being declared as conforming whereby the buffer BUFF is permitted to start transmission of this referred frame.

It has to be remarked that although this preferred embodiment is described with the inclusion of an "End Of Frame" indication in the first control signal CTRL1, the invention is not restricted to an application with such an inclusion. Indeed, the described embodiment can be adapted with small modification, evident to a person skilled in the art to explain the use of a data traffic policer with no explicit inclusion of the "End Of Frame" in such a first control signal CTRL1 e.g. in an ATM network the End Of Frame is part of the ATM cell i.e. AUU bit whereby the "End Of Frame" indication is extracted from the data cell itself in order to update the related parameter.

Furthermore the status means STAT also generates a fourth control signal CTRL4 in the event when the non-conforming parameter NCF for a particular frame e.g. F3 became true T i.e. the status means STAT received a conformance result of a data cell of this frame F3 that is non-conforming. At this point it is known to the data traffic policer, that this frame will never be conforming. As it is described in a previous paragraph the data traffic policer marks or discards this non-conforming data cell, according to the operator its strategy. Furthermore the next incoming data cells of this frame will also be marked or discarded. Finally, the data traffic policer POL counts the non-conforming data cells.

An advantage of the present invention becomes clear now. Indeed, the data traffic policer is also able to mark or to discard the already buffered data cells of a frame that became non-conforming. Indeed, these data cells are buffered in the buffer BUFF and are not yet distributed into the network. This makes that in the event when a non conforming data cell is received at the data traffic policer its frame is declared to be non-conforming. At this moment, not part of its data cells, but all its data cells will be marked or discarded: the already buffered data cells i.e. head of a frame is immediately marked or discarded and the data cells of the tail of the frame will be marked or discarded upon arrival at the data traffic policer. Since, according to this situation and implementation, it is sure that the first data cell of a frame is always marked or discarded, whereby the data traffic policer is permitted to mark or discard also the last cell of that frame. Indeed, no last data cell of a frame must be retained for the first data cell of that frame that, however, already was distributed into the network.

It is clear that the related action i.e. discarding or marking of a frame is initiated by the fourth control signal CTRL4 that is generated by the status means STAT. However, the detailed description of this related action goes beyond the scope of this invention and will not be described in this application in further detail.

In order to explain the functional working of the present invention a preferred situation will be described in details by means of an example.

Referring to FIG. 1, presume a situation whereby the buffer BUFF is filled with data cells according to its associated frame. In this way for Frame F1 four data cells are buffered; and for Frame F2 ten data cells are buffered; and for Frame F3 six data cells are buffered.

On the other hand the table of the status means STAT includes the following information values for the parameters:

| Frame | NCF | EOF |
|-------|-----|-----|
| F1 | F | N |
| F2 | F | N |
| F3 | T | N |
| . . . | | |

According to this table information e.g. frame F2 is still treated as conforming since its non-conforming frame parameter is "false". This means that for each data cell of frame F2 that is stored in the buffer BUFF the conformance result was conforming. Furthermore, according to the table information, the last data cell of frame F2 is not yet received.

Presume a situation wherein the last data cell of frame F2 just entered the decision means DEC. The decision means DEC starts checking the conformance status of this data cell. Presume that the outcome according to the flow diagrams of the conformance tests of the referred paragraphs of the referred document is that this data cell has a conformance result that is conforming.

This conformance result is included together with the reference to the frame F2 and the "end of frame" information in the first control signal CTRL1. The first control signal CTRL1 is provided by the decision means DEC to the status means STAT. The table of the status means STAT is updated i.e. the value for the non-conforming parameter of frame F2 remains "false" F and the value for the end-off-frame parameter is changed to "Yes" Y:

| Frame | NCF | EOF |
|-------|-----|-----|
| F1    | F   | N   |
| F2    | F   | Y   |
| F3    | T   | N   |
| ...   |     |     |

Furthermore the decision means DEC provides the data cell itself to the buffer means BUFF. The reference to the frame F2 is included in the second control signal CTRL2 and is also provided to the buffer means BUFF. The buffer means BUFF stores the data cell together with the other data cells of the frame F2.

Since the two parameters associated to frame F2 have the value F and Y, the status means STAT declares the frame F2 as conforming. Indeed, the conformance result of the last data cell of the frame F2 is also conforming. The status means STAT generates a third control signal CTRL3. The third control signal CTRL3 includes the frame F2. Upon reception by the buffer BUFF of the third control signal CTRL3 the buffer is allowed to start transmission of the frame referred to in the third control signal CTRL3 i.e. F2. The buffer BUFF starts transmission of this total frame F2 that is declared as conforming.

It has to be remarked that although it is preferred for this particular embodiment to start transmission of the frame upon receiving of the last data cell of the frame, the data cell starting transmission of the frame has not to be the End Of Frame, but can be any predetermined cell of the frame.

A further remark is that although according to this preferred embodiment the data traffic policer is coupled to a communication link, it is evident to a person skilled in the art that a other devices such as a shaper or a complete ATM switch could be coupled instead of.

Finally, it has to be remarked that although this preferred embodiment is described in an Guaranteed Frame Rate environment, the invention is not restricted to an application in an Guaranteed Frame Rate environment. Indeed, the described embodiment can be adapted with small modifications, evident to a person skilled in the art to explain the use of the data traffic policer in another kind of Quality Of Service category, such as e.g. the unspecified Bit Rate Service category.

While the principles of the invention have been described above in connection with specific apparatus, it is to be clearly understood that this description is made only by way of example and not as a limitation on the scope of the invention, as defined in the appended claims.

The invention claimed is:

1. A method for data traffic policing in a telecommunication network by a data traffic policer on a data communication link, said data traffic including data cells which are grouped into frames, said method comprising:

for each data cell of a frame, upon reception of said data cell, checking a conformance of said data cell according to predefined conformance rules and providing a conformance result of said data cell being any one of conforming and non-conforming;

determining a position of said data cell within said frame;

storing said data cell into a frame buffer and indicating said frame as conforming when, for each data cell of said frame being stored in said frame buffer, said conformance result is conforming; and in the event that both said frame is conforming and the position of said cell is the last cell of said frame, starting transmission of a predefined number of data cells of said frame by said traffic policer.

2. The method according to claim 1, wherein said predefined number of data cells is a total number of data cells of said frame.

3. The method according to claim 1, wherein said predefined conformance rules are any one of cell based conformance rules and frame based conformance rules.

4. The method according to claim 1, said method further comprising marking all data cells stored in said frame buffer as non-conforming when said conformance result of one data cell is non-conforming.

5. The method according to claim 1, said method further comprising treating said frame as non-conforming when said conformance result of at least one data cell stored in said frame buffer is non-conforming.

6. The method according to claim 1, wherein said data cell is an ATM cell, and said method further comprises determining the position of said data cell based on virtual channel identifier and virtual path identifier fields in said data cell.

7. A data traffic policer to be used in a telecommunication network for data traffic policing on a data communication link, said data traffic includes data cells which are grouped into frames, said data traffic policer comprising:

a decision means coupled to an input of said data traffic policer to check for each incoming data cell of a frame for conformance according to predefined conformance rules and to provide thereby a conformance result of said data cell which is any one of conforming and non-conforming, and to determine a position of said data cell within said frame;

a buffer means coupled to said decision means to store said checked data cell; and a status means coupled to said decision means to store a conformance status of said frame whereby said conformance status of said frame is conforming in the event each data cell of said frame being stored in said buffer means is conforming; and a transmitting means to staff transmission of a predefined number of data cells of said frame when the position of said cell is the last cell of said frame received by said data traffic policer and said conforming status of said frame is still conforming.

8. The data traffic policer according to claim 7, wherein said predefined number of data cells is a total number of data cells of said frame.

9. A telecommunication network, wherein said telecommunication network includes a data traffic policer according to claim 7.

10. The telecommunications network according to claim 9, wherein said telecommunication network supports a guaranteed frame rate service category and that said conformance is checked according to conformance definitions of said guaranteed frame rate service category.

11. The data traffic policer according to claim 7, wherein all data cells stored in said buffer means for said frame are marked as non-conforming when said conformance result of one data cell is non-conforming.

12. The data traffic policer according to claim 7, wherein said status means indicates said frame as non-conforming when said conformance result of at least one data cell stored in said buffer means for said frame is non-conforming.

13. A data traffic policer to be used in a telecommunication network for data traffic policing on a data communication link, said data traffic includes data cells which are grouped into frames, said data traffic policer comprising:
   a decision device coupled to an input of said data traffic policer to check for each incoming data cell of a frame for conformance according to predefined conformance rules and to provide thereby a conformance result of said data cell which is any one of conforming and non-conforming, and to determine a position of said data cell within said frame;
   a frame buffer coupled to said decision device to store said data cell; and
   a status device coupled to said decision device to store a conformance status of said frame whereby said conformance status of said frame is conforming in the event when for each data cell of said frame being stored in said frame buffer said conformance result is conforming; and
   a transmitter to start transmission of a predefined number of data cells of said frame upon when the position of said data cell is the last cell of said frame received by said data traffic policer and said conforming status of said frame is still conforming.

14. The data traffic policer according to claim 13, wherein said predefined number of data cells is a total number of data cells of said frame.

15. The data traffic policer according to claim 13, wherein all data cells stored in said frame buffer for said frame are marked as non-conforming when said conformance result of one data cell is non-conforming.

16. The data traffic policer according to claim 13, wherein said status device indicates said frame as non-conforming when said conformance result of at least one data cell stored in said frame buffer for said frame is non-conforming.

* * * * *